United States Patent
Krietemeier et al.

(12)

(10) Patent No.: US 6,311,868 B1
(45) Date of Patent: *Nov. 6, 2001

(54) DISPENSER WHICH INCREMENTALLY HEATS FLUIDS WITH SUBSTANTIAL NON-VOLATILE CONSTITUENT PARTS

(75) Inventors: Rickie F. Krietemeier, Englewood; Albert W. Gebhard, Denver, both of CO (US)

(73) Assignee: New Sensations, L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/444,527

(22) Filed: Nov. 22, 1999

Related U.S. Application Data

(63) Continuation-in-part of application No. 09/341,421, filed on Jul. 7, 1999, now Pat. No. 6,216,911, and a continuation-in-part of application No. PCT/US99/07540, filed on Apr. 6, 1999.
(60) Provisional application No. 60/080,935, filed on Apr. 6, 1998.

(51) Int. Cl.$^7$ .................................................. G01F 11/00
(52) U.S. Cl. .......................... 222/1; 222/54; 222/146.5; 222/325; 222/642
(58) Field of Search ................................ 222/1, 54, 642, 222/146.5, 325, 444

(56) References Cited

U.S. PATENT DOCUMENTS

| | | |
|---|---|---|
| 4,263,498 | 4/1981 | Meyers . |
| 4,274,588 | 6/1981 | Schwob . |
| 4,544,085 | 10/1985 | Frazer . |
| 4,782,212 | 11/1988 | Bakke . |
| 4,847,470 | 7/1989 | Bakke . |
| 5,040,700 | 8/1991 | Compton . |
| 5,111,969 | 5/1992 | Knepler . |

*Primary Examiner*—Joseph A. Kaufman
(74) *Attorney, Agent, or Firm*—Sheridan Ross P.C.

(57) ABSTRACT

The present invention discloses a method and apparatus for quickly heating a predetermined volume of viscous fluid and dispensing it efficiently at one or more selected temperatures. The viscous fluid includes substantial non-volatile constituent parts. In one embodiment, the predetermined volume of viscous fluid is partially housed in a predelivery chamber separate from the main fluid reservoir. A heater assembly heats the viscous fluid in the predelivery chamber in a short time period and in small volumes to prevent overheating and adversely effecting the composition of the viscous fluid. To avoid continually heating the viscous liquid, a timer circuit is used in one embodiment.

22 Claims, 17 Drawing Sheets

DISPENSER WHICH INCREMENTALLY HEATS FLUIDS WITH SUBSTANTIAL NON-VOLATILE CONSTITUENT PARTS

This application is a continuation-in-part application of PCT patent application Ser. No. PCT/US99/07540 filed on Apr. 6, 1999, designating the United States which was filed Jun. 30, 1999, U.S. Ser. No. 09/341,421 filed Jul. 7, 1999, now U.S. Pat. No. 6,216,911 which claimed priority of the provisional patent application Ser. No. 60/080,935, having a filing date of Apr. 6, 1998, the applications being incorporated herein in their entirety by reference.

FIELD OF THE INVENTION

This invention relates in general to heating and dispensing apparatus used for fluid which includes substantial non-volatile constituent parts and more specifically to a hot fluid dispenser which only heats a portion of the fluid before it is dispensed.

BACKGROUND INFORMATION

Fluids such as body lotions and oils are commonly applied to the human skin to address dry skin problems, eczema and other skin disorders. These lotions are typically stored in containers at ambient air temperature and are applied to the body by means such as squirt bottles and hand pump dispensing apparatus. These lotion dispensers unfortunately produce the lotions at temperatures well below the normal skin temperature of the human body (i.e., somewhat less than 98.6°). Not only is the application of body lotions at cool temperatures uncomfortable for infants, the elderly and the general user, the cooler temperatures prevent the lotion from adequately penetrating the pores of the skin since the cool temperature makes the skin pores constrict rather than open up to receive the body lotions.

Although attempts have been made to heat fluids prior to this application, these devices generally heat the fluids in mass in a bulk storage container. Over time, this process resulted in separation and breakdown of the natural composition of the body lotions or fluids, thus reducing their effectiveness. For example, the paraffins in some lotions tend to break down when heated to temperatures above 110° F. for extended periods of time. Further, the continual heating and cooling of the lotion causes a coagulation of the non-volatile components when the solvents evaporate which over time can clog the pumping or dispensing mechanism, as well as destroy a larger portion of the lotion, which is expensive. Additionally, the amount of time required to heat larger containers of body lotions is not practical for a user which prefers the lotion to be heated in a matter of minutes or seconds. Leaving lotion heated for extended periods of time can also cause bacteria, algae and other undesired microorganisms to grow in the lotion.

In addition to heating the bulk storage container, some have also applied heat to a dispensing tube of commercial pumps. Fluid in the dispensing tube can cool between uses, so heat is applied to this tube to avoid cooling. However, heating a small portion of the fluid can evaporate the solvent components in the fluid which makes the remaining fluid more viscous. Maintaining a desired viscosity is important to avoid potential clogging of the dispensing tube and/or otherwise ruining the fluid. The heat is applied to the storage container and dispensing tube continually. However, applying heat continually consumes costly energy and is impractical for a consumer unit which may only be required infrequently.

SUMMARY OF THE INVENTION

The present invention discloses a method and apparatus for quickly heating a predetermined volume of body lotion and dispensing the body lotion efficiently at a selected temperature. The predetermined volume of body lotion is housed in a predelivery chamber separate from the main fluid reservoir. The present invention is generally a portable device which may be operated manually, or more typically, electrically.

It is thus one object of the present invention to provide lotion heater assembly which heats the lotion in a short time period and in small volumes to prevent overheating and adversely effecting the lotion composition. Thus, in one aspect of the present invention, a heating element is coupled to the predelivery chamber as opposed to in a heating plate "jacket" or other device which heats the main fluid reservoir. The present invention heats only a predetermined volume of lotion in the predelivery chamber which is soon used by the consumer or masseuse applying the lotion. This avoids subjecting a volume of the lotion to heating over long periods of time.

It is another object of the present invention to provide a pumping assembly which either manually or automatically pumps a predetermined increment of lotion which has been spontaneously heated. In one aspect of the present invention, the heating element may be in operable contact with the predelivery chamber or dispensing spout to provide immediate heating of the lotion prior to dispensing.

It is another object of the present invention to provide a heated fluid pump which can be used with conventional lotions commonly purchased by the household consumers so as to not require unique and expensive compositions specialized for heating. Thus, the heating apparatus may be universally used with substantially all lotions currently sold over the counter. Conversely, specially formulated lotions specifically designed for heating may be sold either independently or in conjunction with the heated fluid pump.

Additionally, in another embodiment of the present invention a small container or tub with a predetermined volume of lotion may be sold which is designed to custom fit the interior of the heated fluid pump. This configuration allows the container or cup to be readily disposed of after use to avoid the need to clean or otherwise maintain the main fluid reservoir of the fluid pump. The cup, in one embodiment, may resemble a plastic cup with a foil cover, such as a yogurt cup, and the lotion may be exposed for use by either removing a pull tab cover or by piercing the foil cover with a sharpened suction tube at the bottom of the main fluid reservoir. A hole in the cup could be pierced by a sharp point on the inside of the lid so that pressure would not build in the cup.

Additionally, it is another object of the present invention to provide a thermostatically controlled heating element which assures the proper lotion temperature during all periods of use. Thermostatic control reduces the risk of malfunction which could overheat the lotion. Thus, the device is safe for infants, the elderly and for others especially sensitive to heated products. Additionally, the pumping and dispensing apparatus of the present invention creates a predetermined even flow of heated lotion which prevents waste or overuse.

Alternatively, in a preferred embodiment of the present invention a heating assembly is provided which does not require the use of a thermostat to control the temperature of the lotion. Rather, the lotion is heated for a predetermined time period as the lotion flows through the preheating chamber, which contains a heating element disposed therein. Since the temperature of the heating element is known, the amount of time the lotion is exposed to the heating element in the preheat chamber dictates the temperature of the discharged lotion. Thus, the warmer the desired lotion temperature, the longer the lotion is exposed to the heating element in the preheat chamber. The amount of time, and thus the overall lotion temperature is preferably adjustable based on three different temperature settings of "low", "medium" and "high", which is located on a switch position on the exterior surface of the lotion dispenser.

It is a further object of the present invention that the lotion travel through an annular channel defined by the exterior surface of the heating element and the interim surface of the predelivery chamber. This positioning of the heating element within the predelivery chamber provides optimal heat transfer since the lotion is in direct contact with the heating element tube which provides a significant surface area for heating.

The advantages of using heated lotions are numerous over applying cold lotions to the human body. The advantages include:

1) Heated lotions tend to penetrate the skin better. The human skin temperature is approximately 95°. If 75° or cooler ambient air temperature lotion is applied to 95° skin, the pores of the human body tend to close. However, if 120° lotion is applied the pores tend to open, allowing for better and deeper penetration of the lotion.

2) Heated lotions have lower viscosity than cooler lotion which allows for better penetration. Lotions with lower viscosity are thinner and thus easier to apply and penetrate the skin better than cooler lotions.

3) Heated lotions have less drag or friction when applied by a masseuse or the user because of the lower viscosity. This allows less pulling on the skin or stretching and is applied easier and in a more desirable fashion than cooler lotions.

4) Heated lotions are cost effective since less lotion is more efficiently absorbed and the user thus saves money. Additionally, heated lotions cover more area and leave less waste atop the skin to evaporate based on the higher penetration rates.

5) Heated lotions have a therapeutic affect on joint aches for people suffering from arthritis, sore muscles, over exertion, and other afflictions. Some of these therapeutic effects may be attributed to the sensual appeal of heated lotions.

6) Heated lotions feel better when applied to cold skin whereas cold lotions have a shocking effect to the skin, especially to infants and the elderly. Thus, the present invention eliminates the need of parents to try to warm lotions by hand rubbing before applying lotions to a baby or other person. Additionally, the portable heating apparatus alleviates the problem of parents attempting to heat lotions by submerging bottles in hot water or using heating elements like ovens or microwaves which may potentially overheat lotions and may burn the child.

Other objects, features and advantages of the invention will be apparent from the following specification taken in conjunction with the following drawings.

DETAILED DESCRIPTION

The heated lotion pump is generally comprised of a main fluid reservoir, a pumping assembly, and a heater assembly which may be used in conjunction with a predelivery chamber to heat a predetermined volume of lotion. The apparatus is portable, and may be operated either manually (for dispensing), or more commonly operated electrically. The heated lotion pump is reusable, can be filled over and over again with various types of products and can be disassembled for easy cleaning.

The present invention allows delivery of heated lotion on demand in just a few seconds or up to 30 minutes with temperatures varying from 80° to 180°, depending upon factory installed components and end use. Additionally, the lotion pump has safeguards to prevent overheating and/or electrical shock. In a preferred embodiment of the present invention, a manually controlled thermostat may be used to adjust the lotion temperature to the specification and comfort of the user. A number of temperatures could be utilized which would be selected by way of a hi/low switch, a slider switch, a rotary potentiometer, or the like. Further, a thermal cut-out (TCO), bi-metallic switch or the like can be used as a thermal fuse which trips when the temperature exceeds a predetermined threshold. In other embodiments, a positive temperature coefficient (PTC) which is capped to provide less than 300° F. heat could also provide further safeguards.

Figure 16:
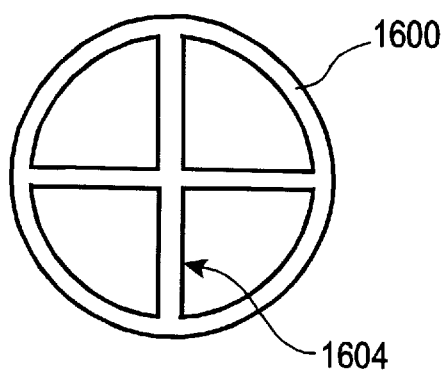
FIG. 16 is atop cross-sectional view schematically showing a second embodiment of the interior configuration of the predelivery chamber with additional heat-transfer surface area.
Figure 17:
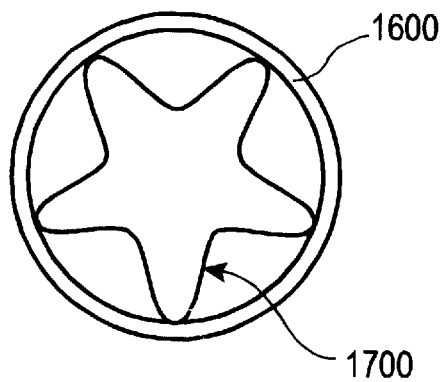
FIG. 17 is a top cross-sectional view schematically showing a third embodiment of the interior configuration of the predelivery chamber with additional surface area.
Figure 18:
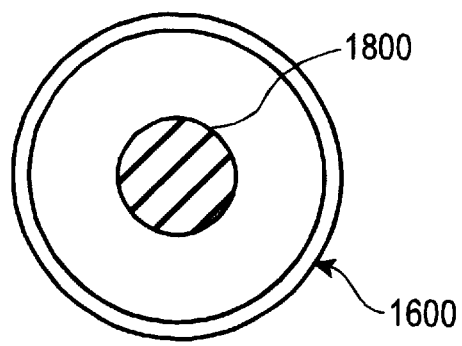
FIG. 18 is a top cross-sectional view schematically showing a fourth embodiment of the interior configuration of the predelivery chamber which has a heat retaining central portion.

With reference to FIGS. 1–8, the heated lotion pump 100 is respectively illustrated in a perspective, right side, left side, front, back, top, bottom, and side-sectional views. The plastic enclosure includes a main portion 104, a front portion 108 and a exterior top or lid 112. Preferably, the main body portion 104, front portion 108 and lid 112 are injection molded with a composite plastic. In this embodiment, the front portion 108 includes a base portion 120. The main portion 108 may also have a molded-in tank to serve as the main fluid reservoir 800 and which may have various configurations depending on the specific application of the present invention. For example, a masseuse may order an enclosure with a main fluid reservoir 800 that has a much larger storage volume as compared to a consumer model which may need the lotion pump 100 for home use only. The main fluid reservoir 800 generally has a high polish finish and funnels towards an outlay 804 near the bottom where the lotion is directed toward the gear pump spur 808. Thus, gravity is used to provide the lotion to the feed pump 808, although alternatively a siphon type feed mechanism could be used. The gear pump spur 808 has two interlocking gears (see FIG. 16) which serve to pump the lotion through the fluid conduit. The temperature of the main fluid reservoir 800 is largely unaffected by the heating element and is generally an ambient temperature. In one embodiment, a battery box 700 with, for example, two AA batteries, an electrical outlet 116 and enclosure for the gear pump assembly 812 also are molded into the main body for simplicity and economy. The materials for the enclosure preferably will be ABS plastic in a number 2 finish or polycarbonates for parts exposed to heat, although any numerous types of materials may be used. For parts exposed to the heated lotion, nylon and/or polypropylene is preferred.

A single injection molded part in the same finish and material as the main body makes up the front portion 108 of the finished unit 100 as well as a bottom portion or base plate 120. In other embodiments however, the bottom portion 120 could be separate to ease manufacturing. Additionally, a single injection plastic molded cap or lid 112 may be utilized which has the same material and finish of the main body portion 104. The lid 112 is generally a user removable cover to close the lotion tank 800 and which also permits access for cleaning purposes. The bottom portion 120 of the enclosure may also include one or more leg portions and/or non-skid rubber feet for resting the dispensing unit on furniture. In one aspect of the present invention, an insulating wall 2100 (see FIG. 21) could be used to isolate the heater assembly 816 of the product from the main fluid reservoir 800, to further reduce unintentional heat coupling to the main fluid reservoir 800. The insulating wall 2100 may also support and attach to the heater assembly 816.

The tank body 820 is generally plastic, metal or any combination of metals and plastics. Preferably the plastics proximate to the heating area contain a polycarbonate or the like to meet code requirements related to fire or overheating. In some embodiments, the tank 820 may be interchangeable to allow changing of the contents and may include a storage portion to receive a disposable bag and/or yogurt cup type container with a seal that can be pierced by a portion of the pumping/dispensing assembly 100. Additionally, the tank 820 may have a level indicator and a filling port to quickly allow the addition of new lotion. Furthermore, the tank 820 may have a pressure device to provide better flow in the unit, a preheater and/or a special coupling valve for removal or flow control. Preferably, the tank/body 820 is constructed of a shatter resistant plastic, and holds a volume of between about 2 and 20 ozs. of lotion in a consumer design or more in a commercial design.

The pump assembly 812 is used to dispense the lotion from the tank body 820 and may be manually operated or electrically powered. The electric power could be supplied by 120 or 240 $V_{AC}$ power supply, batteries (3 $V_{DC}$), a 12 $V_{DC}$ power supply, and/or other known power sources. The pump spur 808 is preferably a gear type, but may be an impeller, a diaphragm, a piston, or a roller and tube (no touch) type which could be driven by a rotary motor, piston motor, linear magnetic device or vibrator. One or more check valves 828 could be used to control backflow and prevent air lock and nozzle drip. Furthermore, the pump assembly 812 could have special amounts of insulation to reduce noise. The pump assembly 812 may additionally include numerous disassembly features to allow for cleaning and maintenance.

Figure 1:
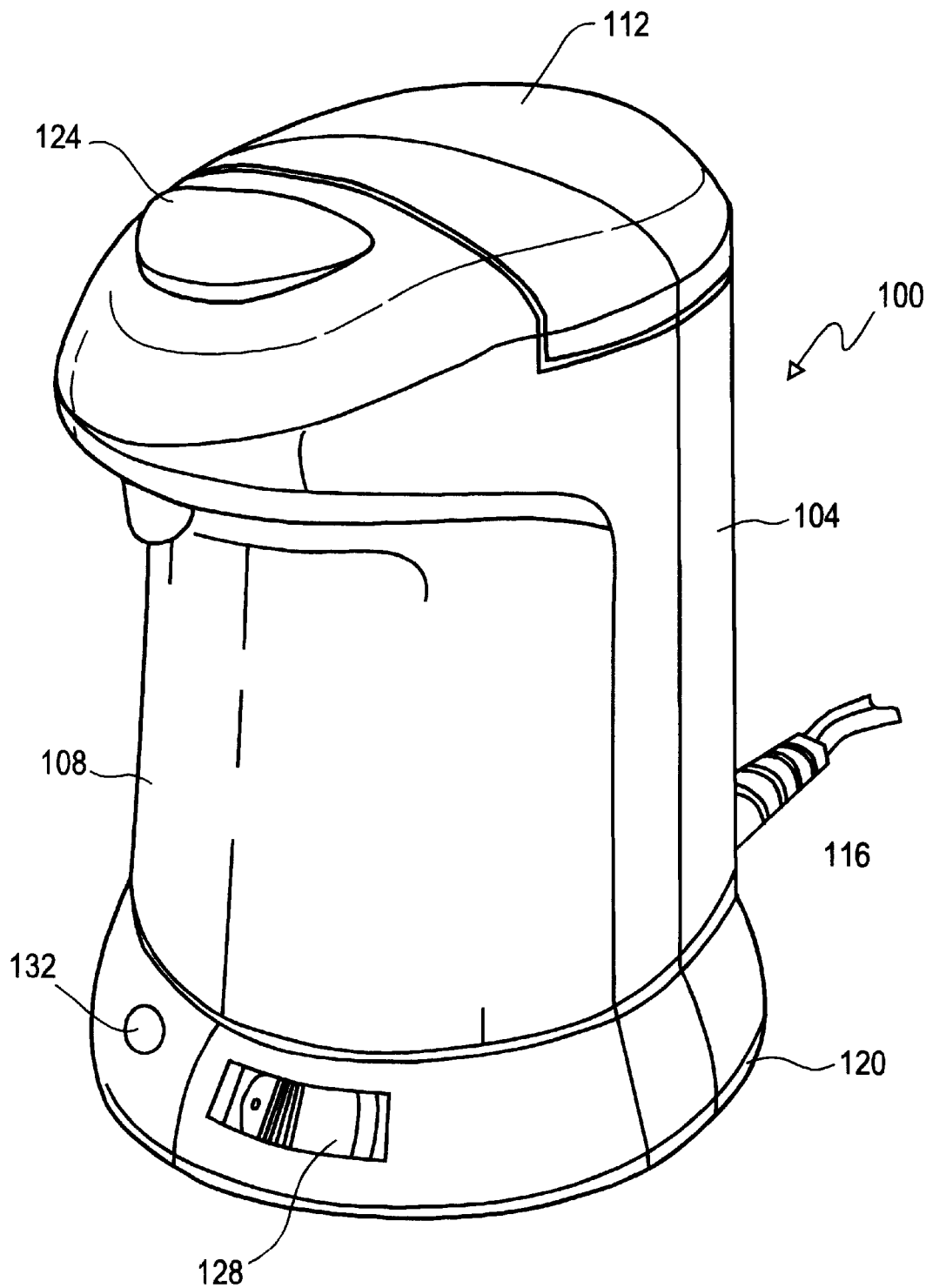
FIG. 1 is a perspective view illustrating an embodiment of a lotion pump which allows selecting at least two set temperatures for heating the lotion.
Figure 2:
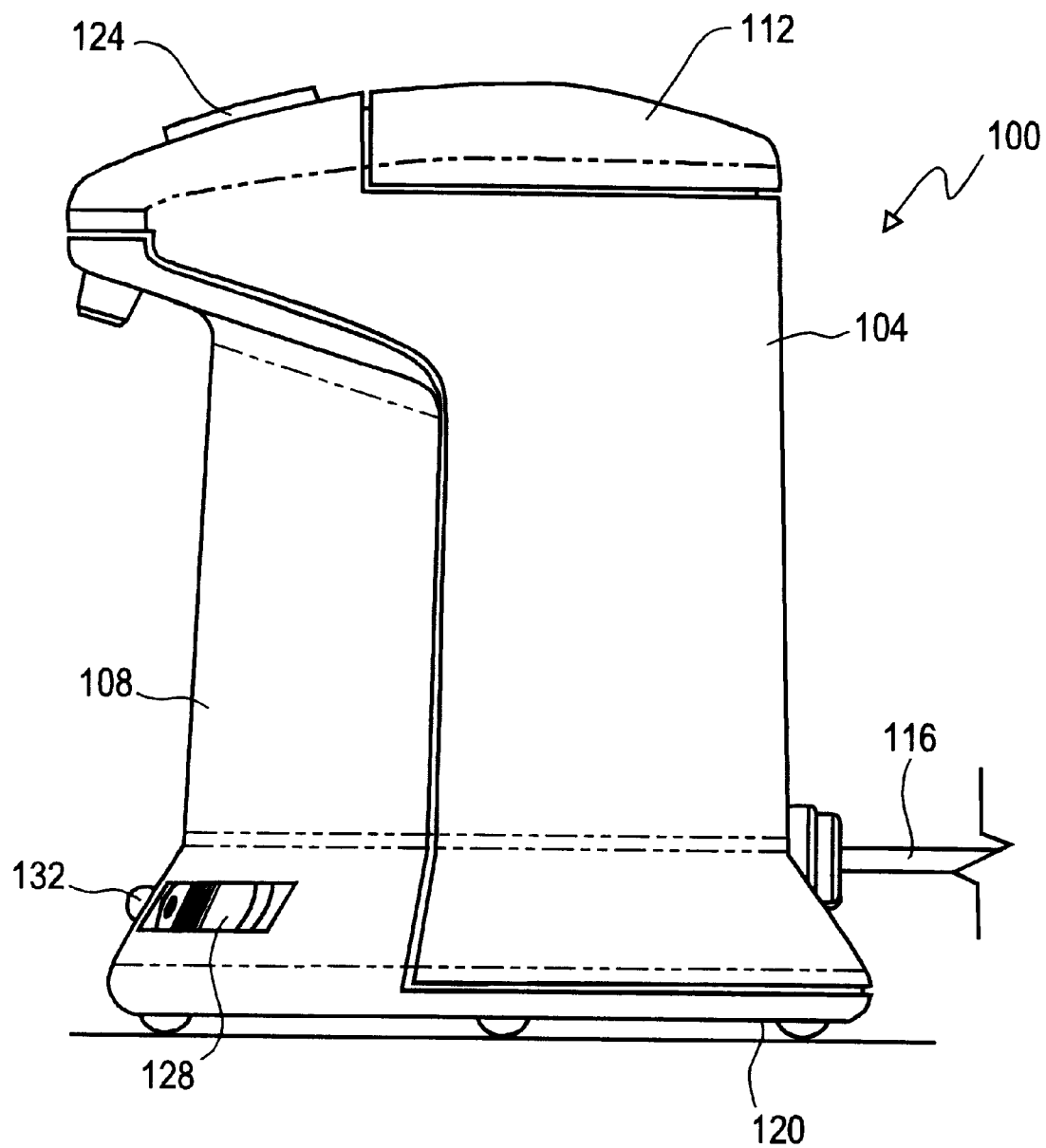
FIG. 2 is a right side elevational view showing the lotion pump of FIG. 1.
Figure 3:
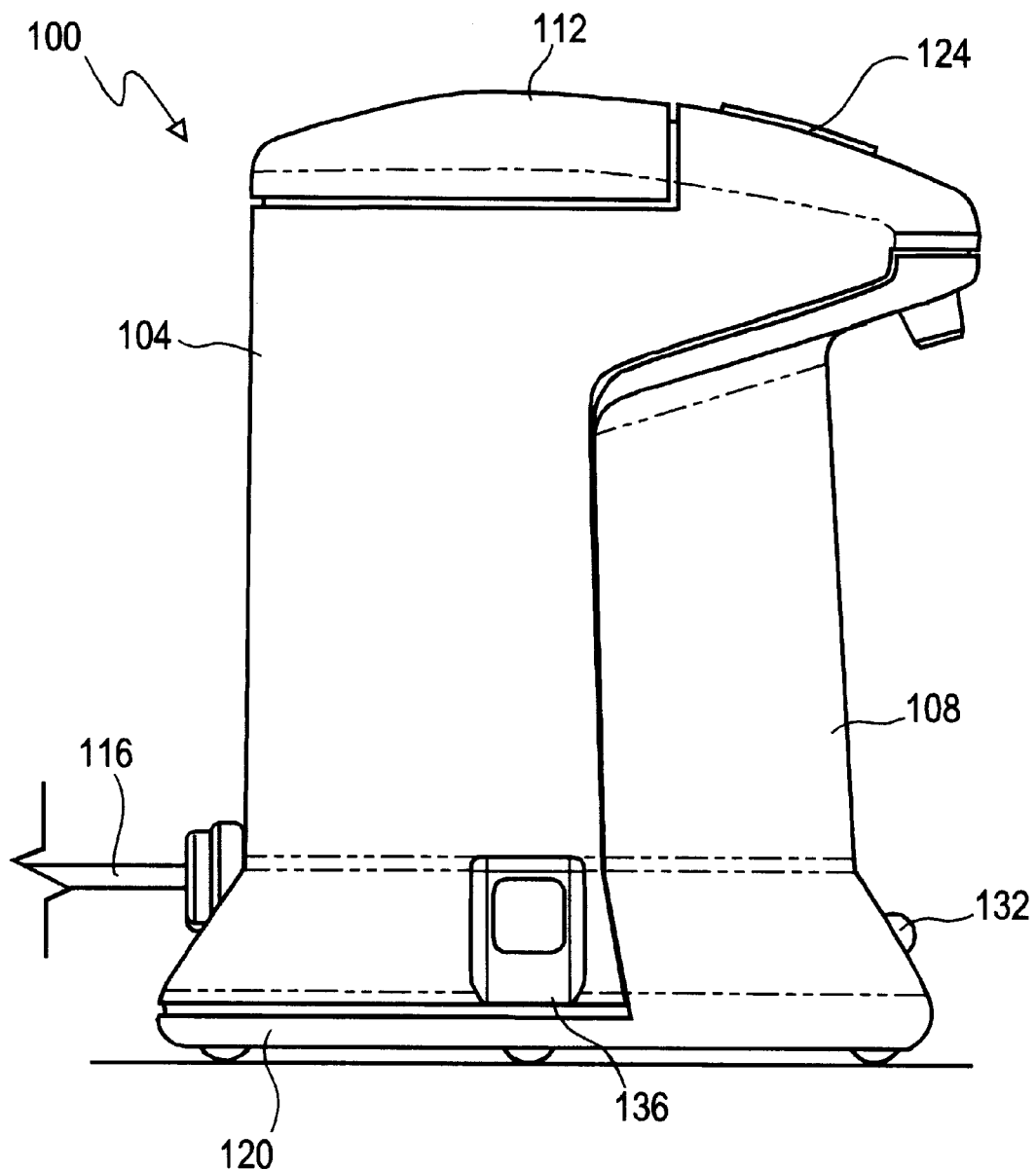
FIG. 3 is a left side elevational view showing the lotion pump of FIG. 1.
Figure 4:
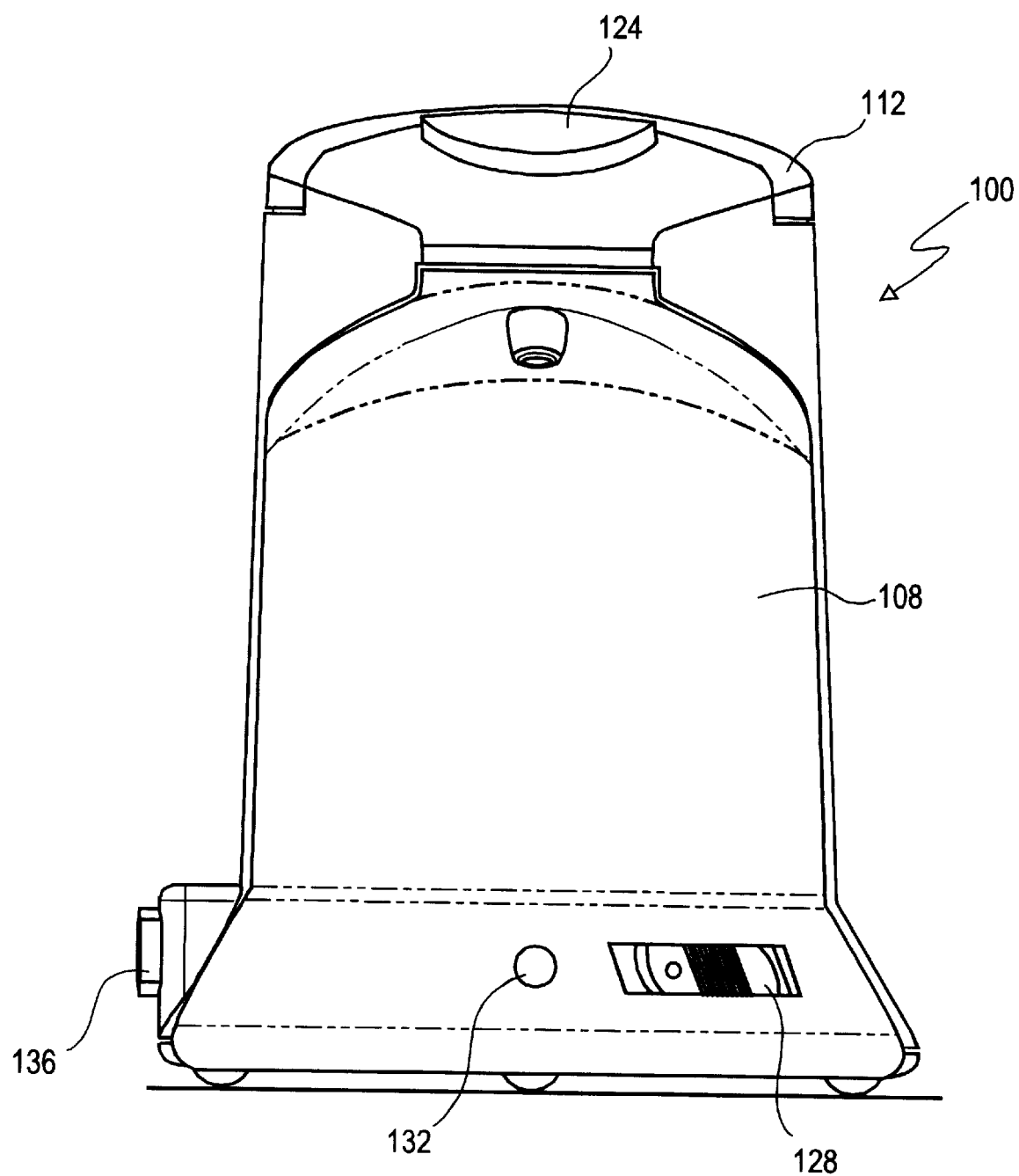
FIG. 4 is a front elevational view showing the lotion pump of FIG. 1.
Figure 5:
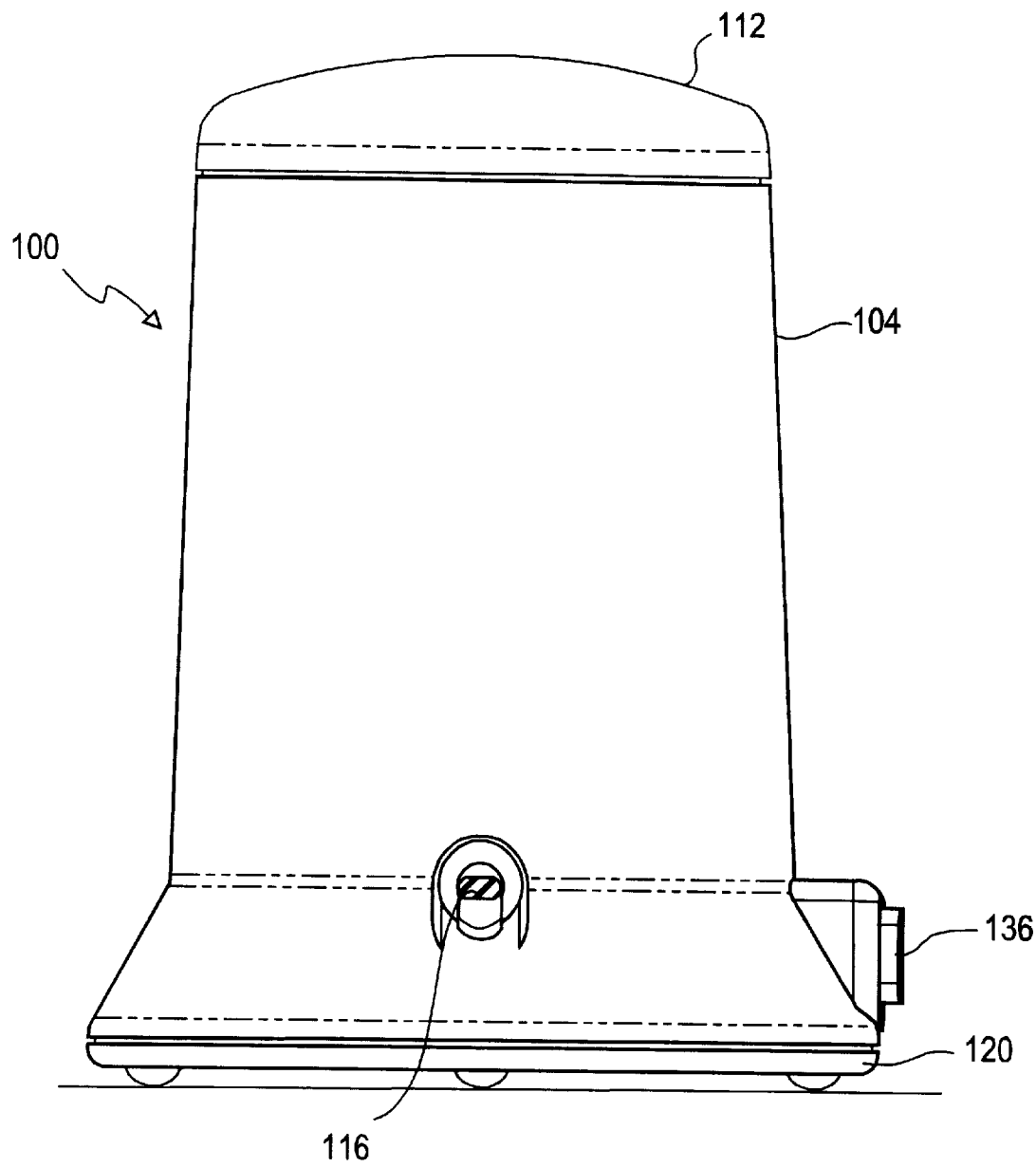
FIG. 5 is a back elevational view showing the lotion pump of FIG. 1.
Figure 6:
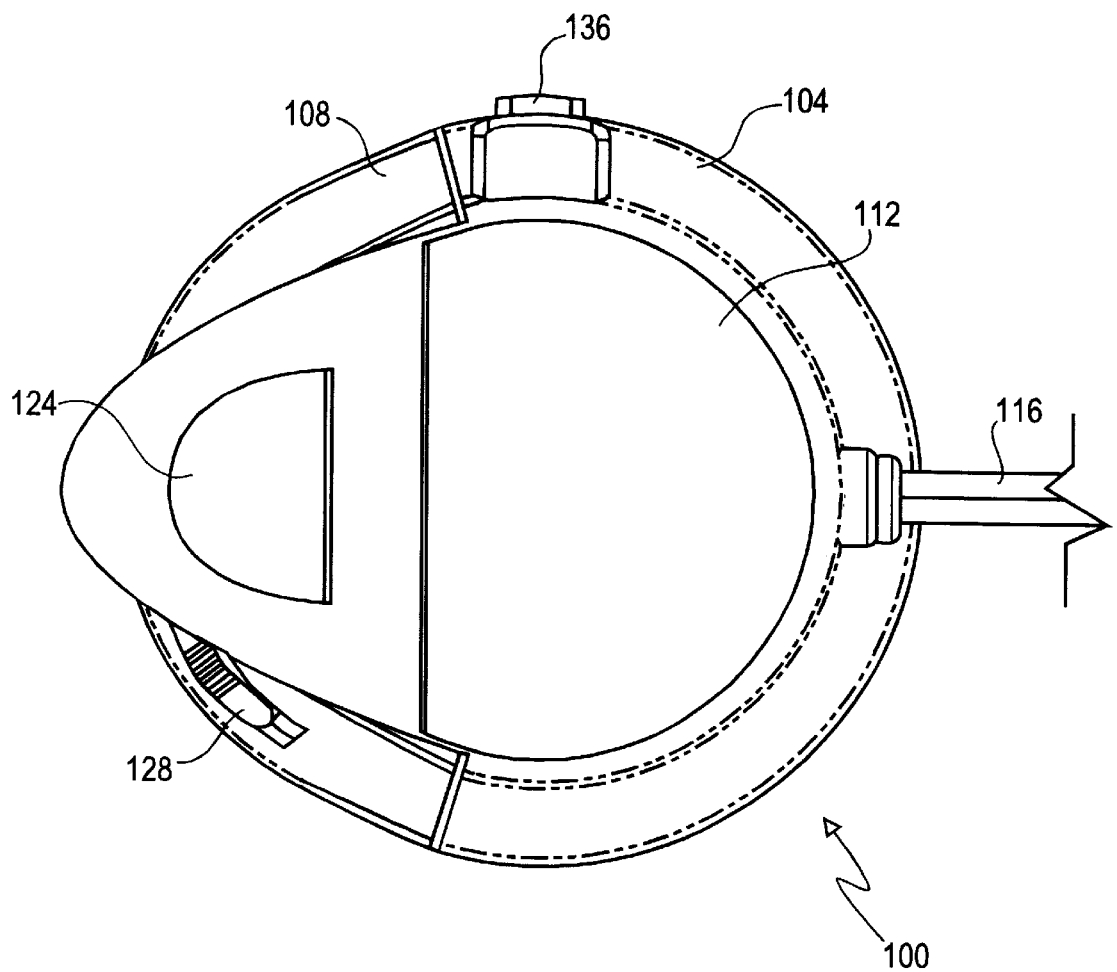
FIG. 6 is a top plan view showing the lotion pump of FIG. 1.
Figure 7:
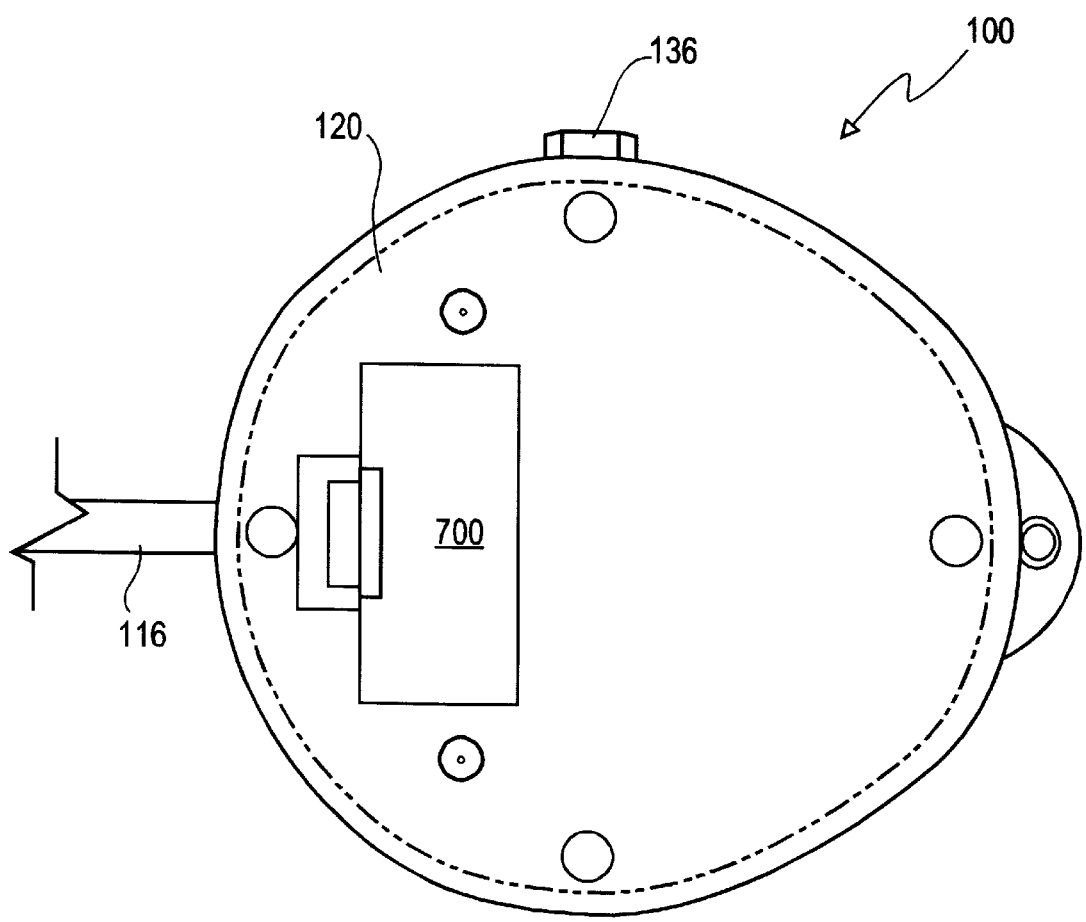
FIG. 7 is a bottom plan view showing the lotion pump of FIG. 1.
Figure 8:
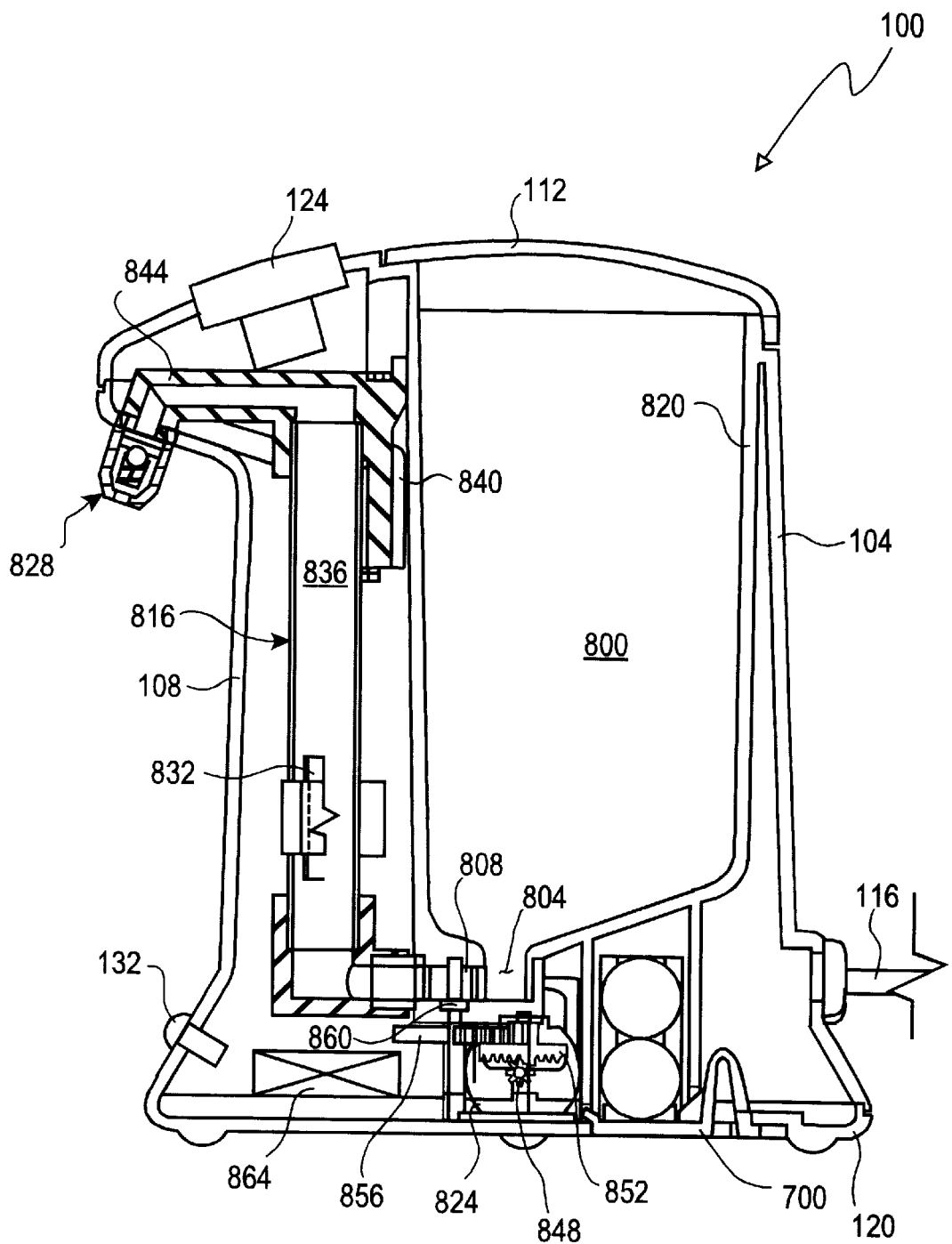
FIG. 8 is a side-sectional view depicting an embodiment of the lotion pump which has a check valve and a resistance type heat element.

The heating element 832 is a PTC type, a variety of resistance types which may be printed/laminated to a flexible film or fabric, or the like. The heating element 832 preferably is adjacent to a predelivery chamber 836, i.e., a chamber of a pipe to allow heating only a portion of the lotion which will immediately be dispensed as opposed to heating the total volume of lotion 800 maintained in the tank body 820. The embodiment in FIG. 8 shows a resistance type heating element 832 clamped to the predelivery chamber 836. The shape of the chamber 836 or pipe can be straight or varied to improve efficiency of heat transfer and may contain a baffle system for internal heating. The baffle system would serve to increase the ratio of surface area to chamber volume so that heat transfer is maximized. Additionally, various conducting materials may be used to store heat and make the heat transfer more evenly to the lotion. Accordingly, a heat conducting material which is known in the art such as stainless steel, aluminum with a protective coating and/or other conductive materials could be used. Further, the wall of the predelivery chamber 836 is preferably thin to more easily conduct heat. The heating element 832 is preferably thermostatically controlled and is preferably interactive with the controls for the pump to allow the heating of the lotion to be controlled between a temperature of between about 80° and 180° F. Preferably, when the tank body 820 and/or predelivery chamber 836 is empty, the heating element 832 will automatically shut off to prevent overheating of the unit. Additionally, a circuit breaker, such as a thermal cut-out TCO 833, is provided to prevent electrical overloading of the heater and which may include a fuse to prevent overheating. The heater assembly 816 is additionally insulated for optimum performance and to again prevent overheating of the tank body 820, pump 812 and/or other components of the lotion pump 100. After the last activation of the pump, the temperature of the predelivery chamber 836 is maintained for a period of time, for example, 20 or more minutes.

A thermal sensor 840 may be utilized to allow the pump to be operational only when the lotion in the predelivery chamber 836 is at its proper delivery temperature. The thermal sensor 840 may be any number of thermostats commonly known in the art, such as a solid state device, thermistor or bi-metallic switch. The thermal sensor 840 works in concert with the heating element 832 under the direction of a control circuit to thermostatically regulate the temperature of the dispensing chamber 836. Preferably, the range of set temperatures is adjustable. Additionally, the thermal sensor 840 could be monitored to prevent activation of the pump assembly until the lotion is properly heated.

The lotion would preferably be heated "in-line" on its way to the delivery point where the lotion will be delivered at a temperature preferably at about 115°. Thus the temperature inside the dispensing chamber tube 836 is to be somewhat higher and in the range of between 120 and 140° F. The gear pump spur 808 pushes the lotion into the dispensing chamber 836 which has an accommodation on the side for a heating element 840 to be press fitted. Generally, the PTC heating element consumes about 5–40 watts while active. To direct the flow of the heated lotion from the top of the dispensing chamber 836 to the delivery point, the dispensing chamber 836 is fitted with a dispensing spout 844.

The drive train used for the pump assembly 812 includes molded plastic gears. The gears are preferably made of Delrin™ because of its lubricity and wear resistance properties. Although, other known compositions could also be used. The gears are designed to fit the size and output requirements of the pump assembly 812. A motor 824 with a pinion gear 848 drives a first gear 852 which drives a second gear 856. Two pump spur gears 808 are driven by the second gear 856. An o-ring 860 seals the drive train from the lotion conduit to avoid possible leakage. In a preferred embodiment a check valve 828 may be interconnected to the dispensing spout to prevent lotions from inadvertently dripping during periods of non-use. Additionally, the check valve 828 keeps air from interacting with the lotion in the lotion conduit which keeps the lotion from drying out and possibly plugging the lotion conduit.

Figure 9:
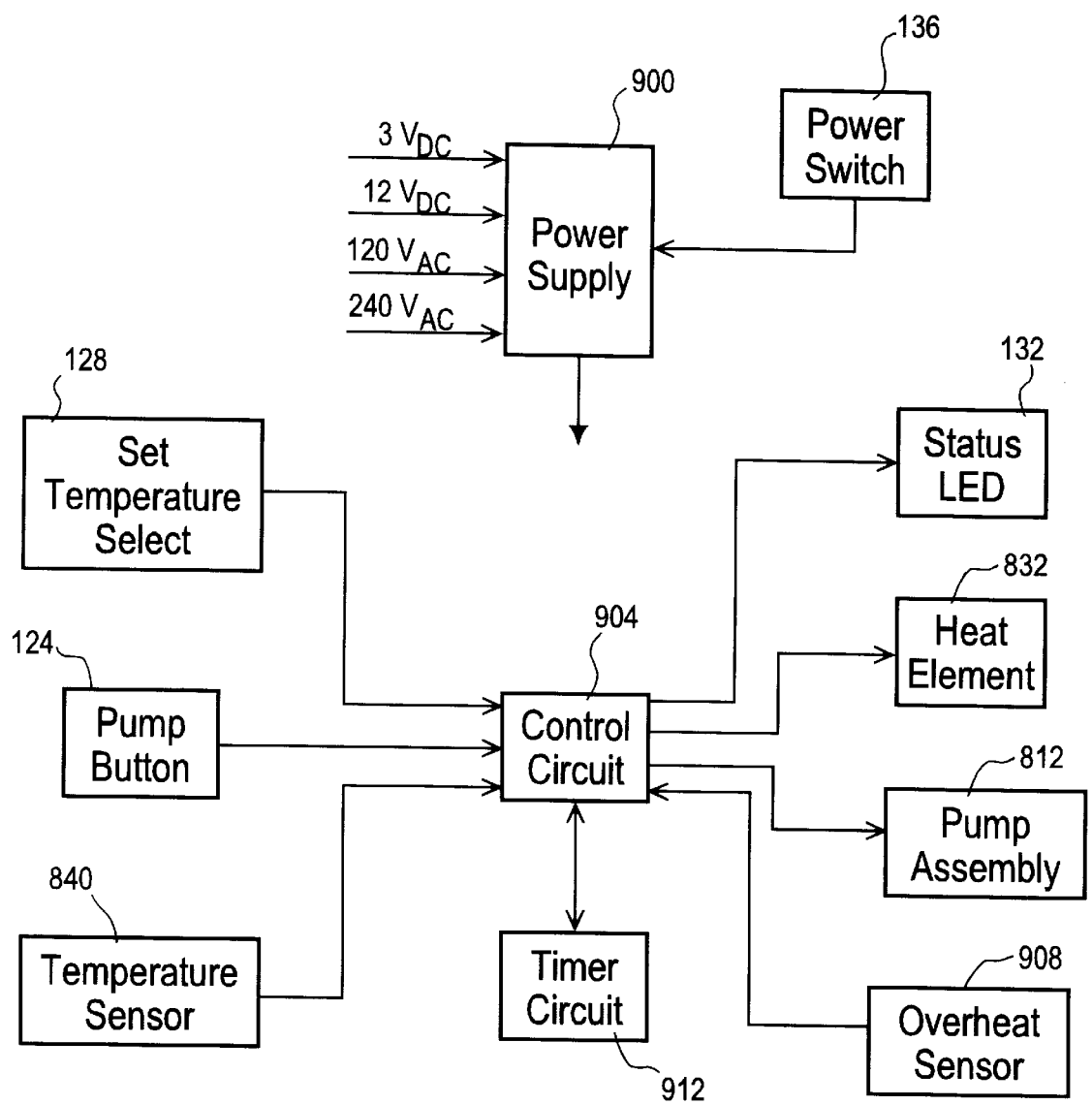
FIG. 9 is a block diagram of the electronics within an embodiment of the lotion pump.

Additionally, there is an accommodation to fit a printed circuit board (PCB) 864 in lower part of the front of the lotion pump 100. The PCB 864 generally accommodates the electronic functions of the lotion pump 100. With reference to FIG. 9, a block diagram of the electronic functions is shown. The power switch 136 activates a power supply 900 to condition and convert the input power from any of the various sources to the proper output power. A control circuit 904 manages the operation of the lotion pump 100 which includes such operations as the thermostat function and automatic power-down function.

The thermostat function controls the temperatures of the predelivery chamber 836 and avoids overheating. A set temperature switch 128 allows selecting the desired set point for the lotion. The set temperature switch 128 could be a slider switch allowing a variable range or is preferably a two position switch allowing two set points. In embodiments with a single set temperature, the set temperature switch 128 is not required. The control circuit 904 reads the set temperature select switch 128 to activate the heat element 832 accordingly. To know when the predelivery chamber 836 is adequately heated, the temperature sensor 840 is monitored.

The status LED 132 be used to indicate when the desired temperature of the lotion is achieved and/or that the power switch 136 has activated the pump 100. The lotion pump 100 takes approximately 60 seconds to reach temperature after activation of the power switch 136. If an overheat sensor 908, such as a TCO, indicates a thermal run-away condition, the control circuit 904 can deactivate the heat element 832 in order to reduce the risk of fire or burns.

The control circuit 904 also manages the automatic pumping function. When the pump button 124 is activated, the pump assembly 812 is powered which causes flow in the lotion conduit. To prevent not adequately cooled lotion from being dispensed, the control circuit 904 could prevent activation of the pump 812 if the lotion has not reached its set point. In other embodiments however, the pump button 124 could avoid the control circuit 904 and directly activate the pumping assembly. The pump button 124 is preferably a momentary switch that indicates to the control circuit 904 a predetermined volume should be dispensed.

The timer circuit 912 saves energy and prevents continual heating of the lotion in the predelivery chamber 836. Continual heating can reduce the lotion to its non-volatile constituent parts. The timer is preferably set for 20 or more minutes. After the power switch 136 is activated, the starts counting its 20 minutes, for example. Each depression of the pump button 124 resets the 20 minute timer. If the 20 minutes expires, the lotion pump 100 is automatically powered down. This power down function saves energy and avoids ruining the lotion with excessive heating. Additionally, activating the power switch 136 a second time could immediately power down the lotion pump 100. The power switch 136 is preferably a momentary switch that activates the lotion pump 100 for a short period of use (e.g., 20 or more minutes).

The momentary power switch 136 effectively is the mechanism which first applies power to the heat element 832. It is a momentary contact, i.e. touch on/touch off (power relay). Preferably the power switch 136 has a very light touch so that the power switch 136 use does not tend to skid the lotion pump 100 on the support surface and so that lotion saturated hands can activate the power switch 136 without slipping. Although a custom molded square shape is proposed for the power switch 136, as appreciated by one in the art, the actual geometric configuration of the switch 136 is not important to the functional attributes of the product 100. The momentary pump button 124 is preferably a soft touch switch that allows power to be delivered to the pump motor 824 as long as it is depressed. No specific switch 124 is proposed or is required although a custom molded "button" which is sealed against lotion intrusion is preferred.

Additionally, the status LED 132 preferably has the ability to glow either a red or green color to respectively indicate that the lotion is being heated and the lotion is ready for use. The color change is accomplished by the reverse polarity of the LED 132. Although other embodiments could have a single color LED which only indicates power is active. Further, any display which allows display of this information could be used.

Figure 10:
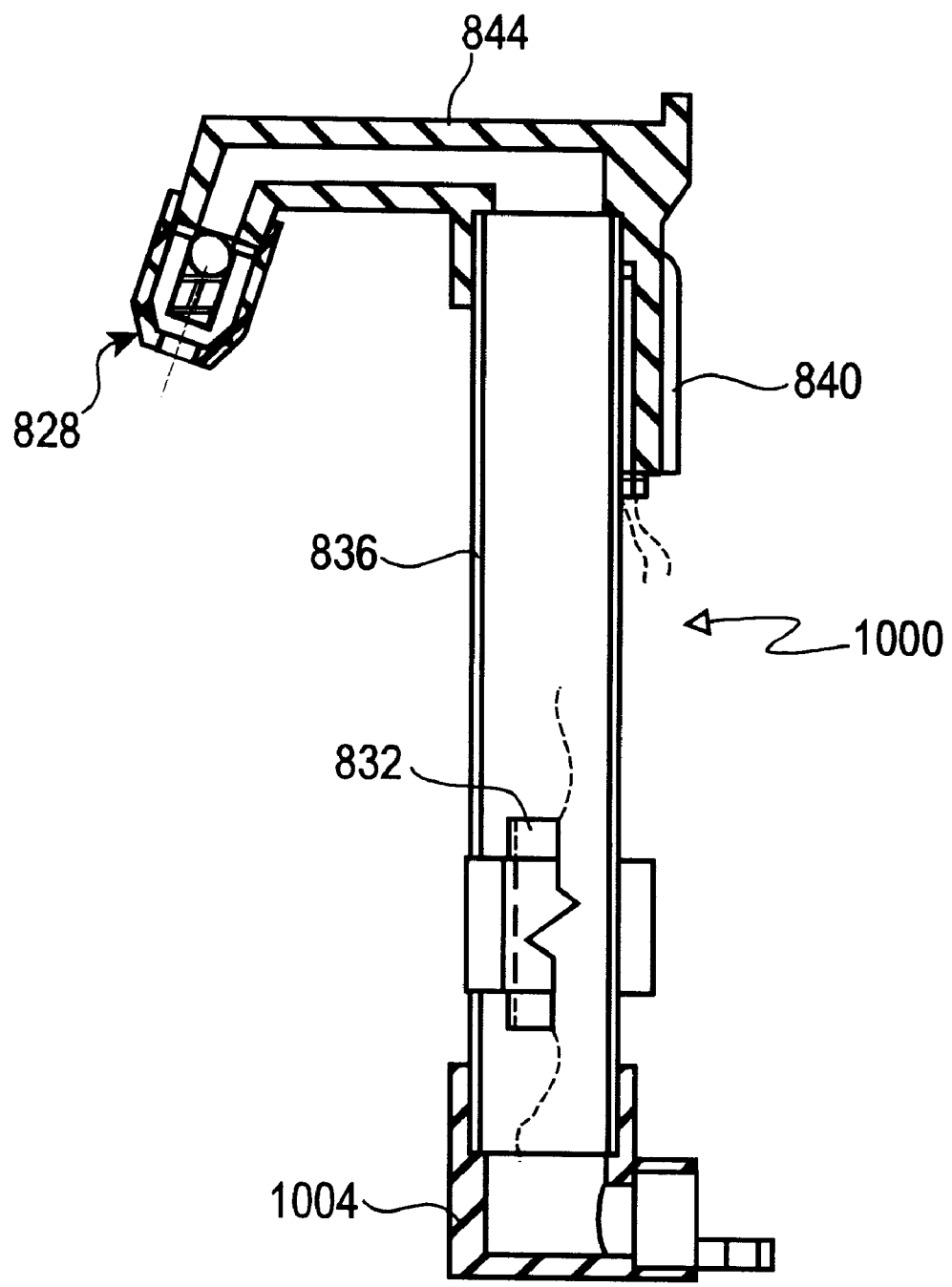
FIG. 10 is a side-sectional view showing an embodiment of the fluid conduit.

With reference to FIG. 10, a side-sectional view of the fluid conduit 1000 is shown. The fluid conduit 1000 is defined by an elbow joint 1004, the predelivery chamber 836, the dispensing spout 844, and the check valve 828. The elbow joint 1004 begins with a diameter which is less than the predelivery chamber 836 and the dispensing spout 844 ends with a diameter which is less than the predelivery chamber 836. The diameter of the predelivery chamber 836 is larger to accommodate a predetermined volume of lotion which is heated. Having a larger diameter predelivery chamber 836 allows for more efficient heating of the lotion with the heating element 832. The dispensing spout 844 is molded to include a means for attaching the heat sensor 840. Lotion resistant plastic nylon or polypropylene is preferably used to make the dispensing spout 844 and elbow joint 1004.

Figure 11:
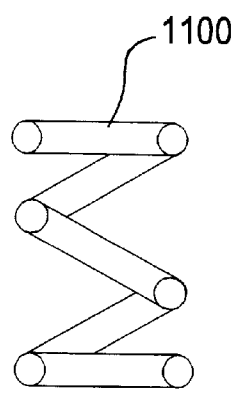
FIG. 11 is a side view illustrating an embodiment of the check valve spring.
Figure 12:
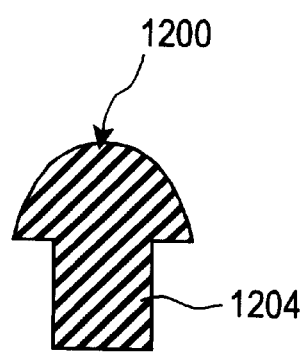
FIG. 12 is a side-sectional view illustrating a mushroom shaped embodiment of the check valve nozzle.

FIGS. 10–12 show two embodiments of the check valve 828 which is used to seal the end of the dispensing spout 844. In FIG. 10, the check valve is comprised of a ball bearing nozzle and spring and in FIGS. 11 and 12 the check valve is comprised of a mushroom shaped rubber nozzle 1200 and spring 1100. The nozzle seal prevents air from entering the liquid conduit 1000. A stem 1204 of the mushroom shaped rubber nozzle 1200 rests inside the spring 1100 to form the valve. While being disassembled, the mushroom shape keeps the spring 1000 and nozzle 1200 together. During dispensing, the pressure created by the pump assembly 812 compresses the spring 1100 by pushing the nozzle 1200 away from the dispensing spout 844. Once the pressure subsides, the nozzle 1200 presses against the delivery end of the dispensing spout 844 to seal the fluid conduit 1000.

Figure 13:
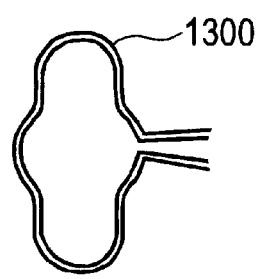
FIG. 13 is a top view showing the heater clip which used to hold the heating elements against the predelivery chamber.
Figure 15:
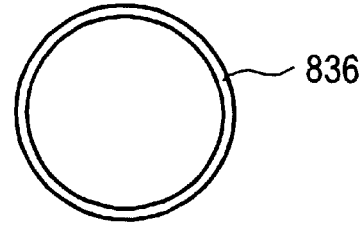
FIG. 15 is a top cross-sectional view schematically showing a first embodiment of the interior configuration of the predelivery chamber.

With reference to FIG. 13, a heater clip 1300 is depicted from a top view. The heater clip 1300 clamps two resistive heating elements to the predelivery chamber 836. Spring steel is the preferred material for the heater clip 1300, but other materials and clamps could be used.

Figure 14:
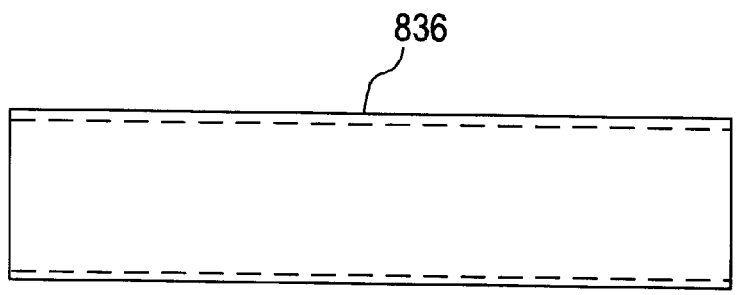
FIG. 14 is a side view illustrating a predelivery chamber.

FIGS. 14 shows a side view of the predelivery chamber 836. A single tube of stainless steel or coated aluminum is preferred for the predelivery chamber 836. Preferably, the chamber 836 can hold a predetermined volume of lotion of 10–20 cc. With reference to FIGS. 15–18, sectional views of the predelivery chamber 836 are shown. The various configurations in FIGS. 16–18 maximize the surface area and heat transfer from the metal to the fluid conduit 1000. The embodiments in FIGS. 16 and 17 have additional surface area 1604, 1700 which thermally conducts with the outside of the chamber 1600. When the outside of the chamber 1600 is heated, the additional surface area 1604, 1700 conducts this heat to the interior of the chamber more efficiently than the embodiment in FIG. 15, for example. The embodiment in FIG. 18 has a heat retaining core 1800 which retains heat to more quickly bring lotion entering the chamber 836 to the set point temperature. Even though the temperature sensor is shown outside the predelivery chamber, other embodiments could embed the sensor inside the predelivery chamber. Integrating the temperature sensor in this way would provide for more accurate measurements.

Figure 19:
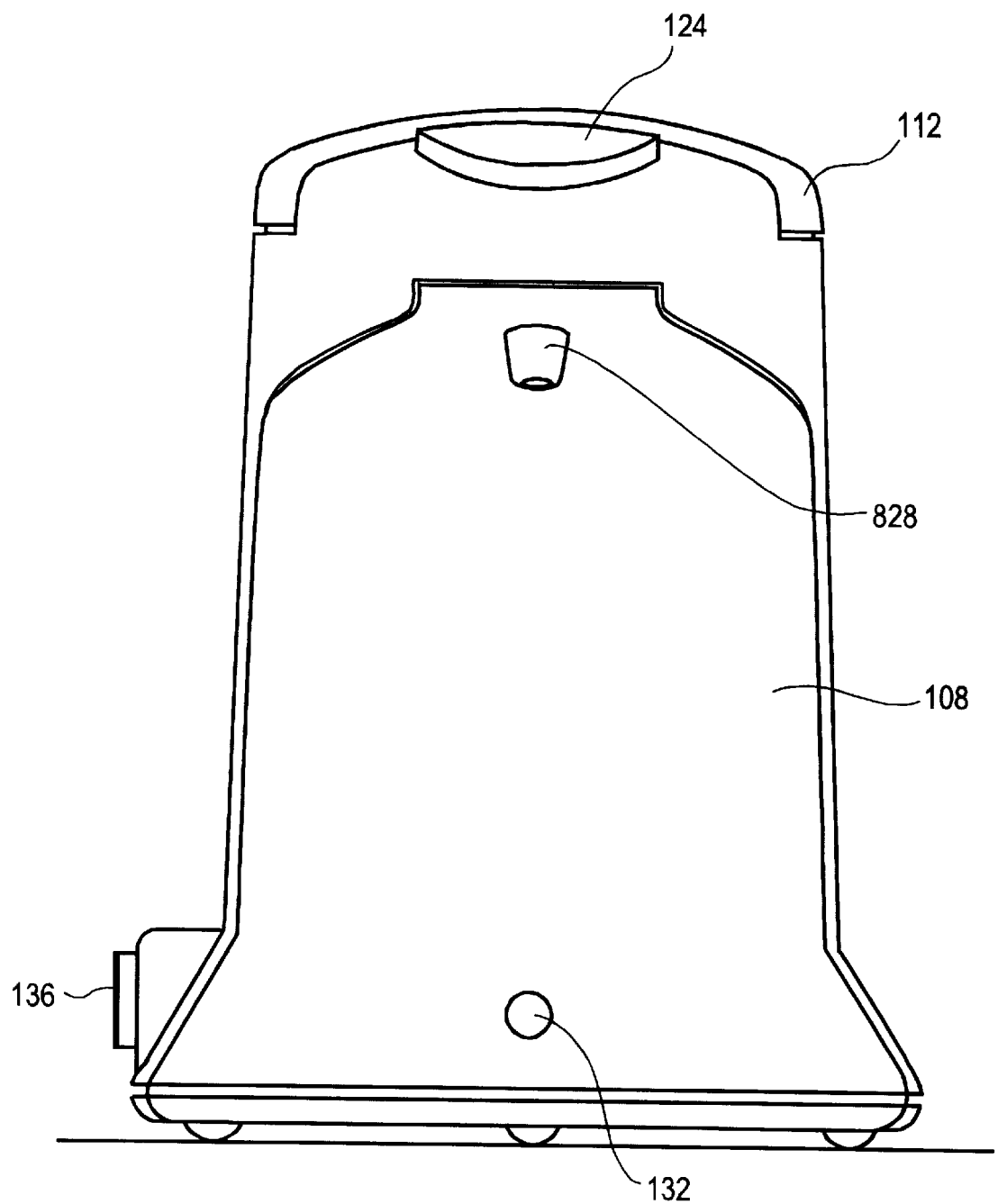
FIG. 19 is a front elevational view showing another embodiment of a lotion pump which does not have a temperature select feature.
Figure 20:
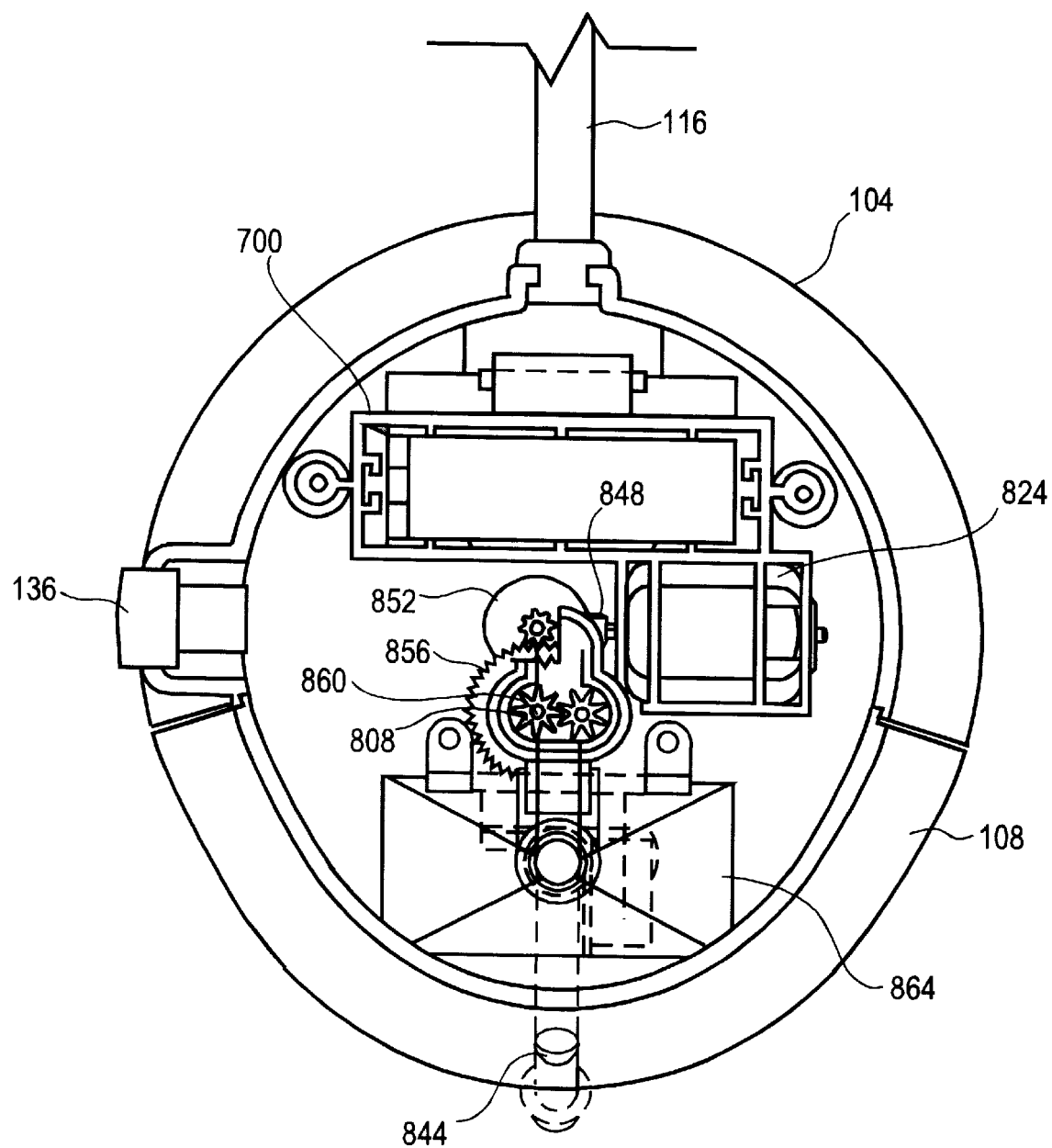
FIG. 20 is a top-sectional view of the lotion pump of FIG. 19 which shows the pumping assembly.
Figure 21:
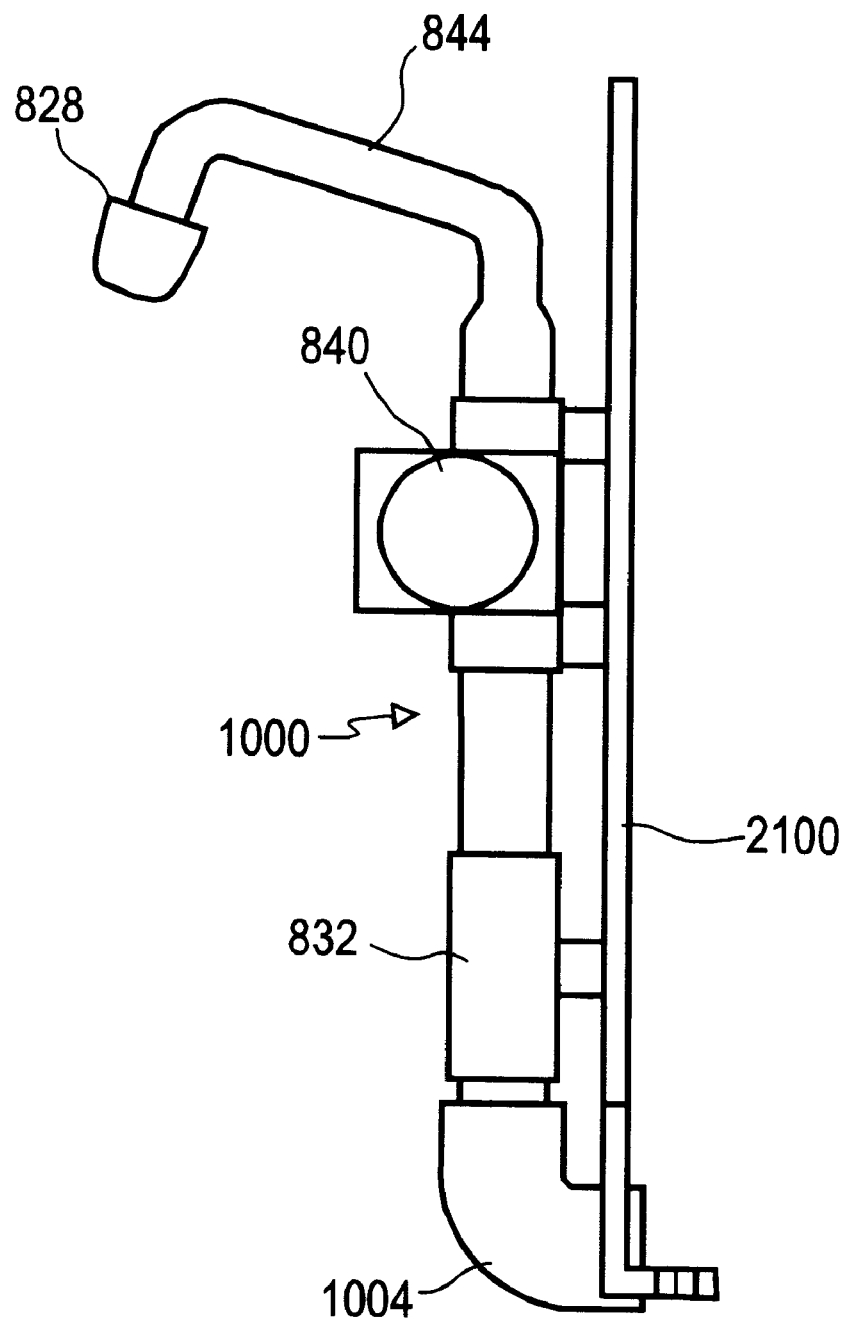
FIG. 21 is a side elevational view of a fluid conduit which does not have a check valve and has a positive temperature coefficient (PTC) heater.

With reference to FIGS. 19–21, another embodiment of the invention is shown. This embodiment has neither a set temperature select button 128 nor a check valve 828. Accordingly, only one predetermined set point is available and air can enter the fluid conduit 1000. Referring specifically to FIG. 20, a cross-section which reveals the gear pump spurs 808 is illustrated. Next, FIG. 21 shows the fluid conduit 1000 attached to an insulating wall 2100. The insulating wall 2100 helps shield the main fluid reservoir 800 from the heating elements 832. The absence of a check valve 828 allows the lotion to at least partially drain from the predelivery chamber 836 back into the main fluid reservoir 800. The embodiment in FIG. 21 uses a PTC heater as the heating element 832.

The above discussion generally discussed dispensing of body lotions, however other fluids (e.g., moisturizers, shaving cream or hair conditioners), oils (e.g., massage oil), food products (e.g., cheese, syrup or chocolate), and other items which are commonly used in households and require heating in small portions could also be dispensed. Any liquid which has substantial non-volatile constituent parts which will not evaporate is a candidate for this invention. In other words, liquids which would tend to concentrate if the solvents contained therein evaporate would benefit most from this invention. For example, liquids such as tap water, salt water, or relatively pure alcohol would not have substantial non-volatile constituent components.

Figure 22:
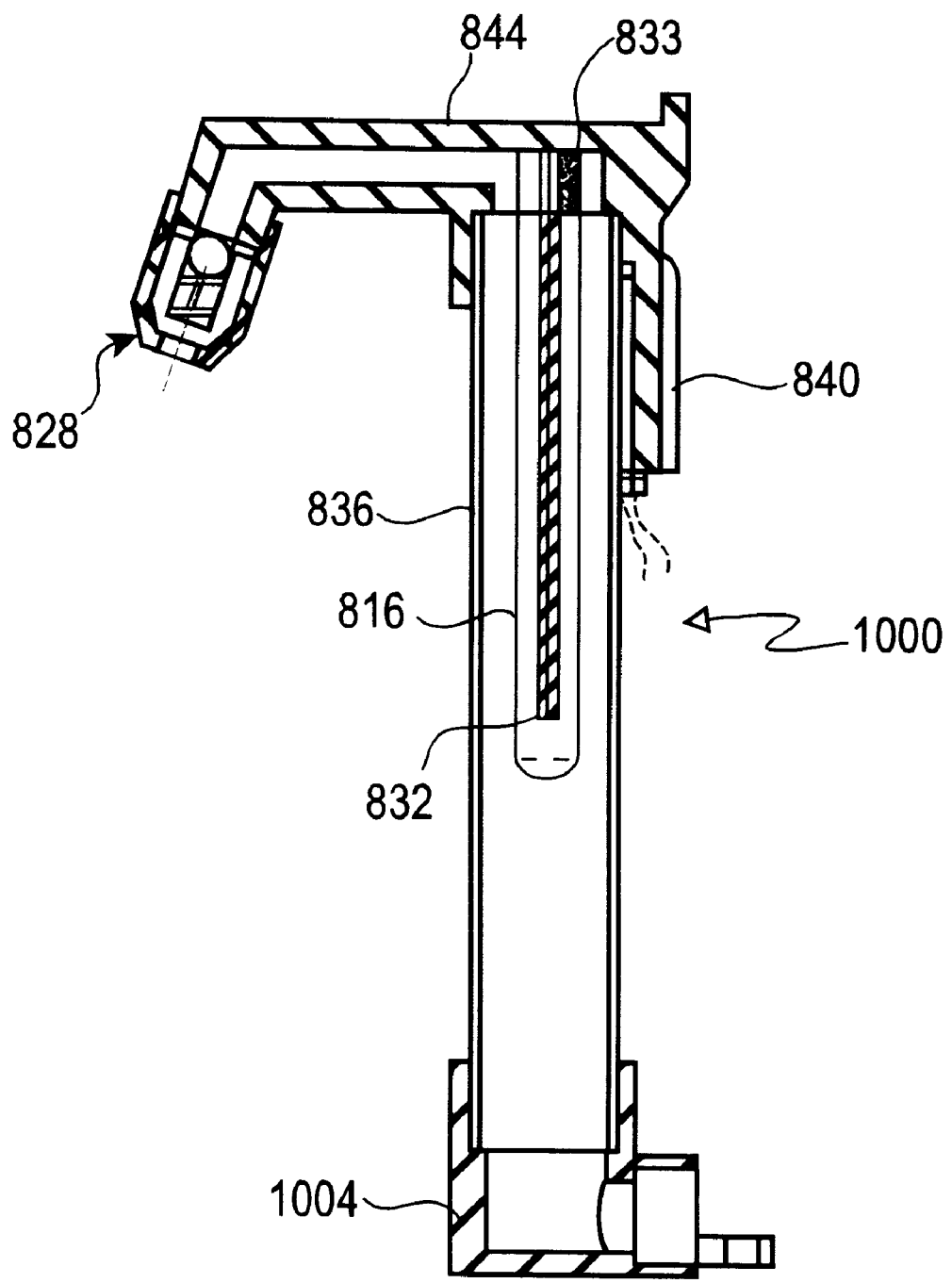
FIG. 22 is a front cut-away elevation view of the lotion dispenser depicting the predelivery chamber dispensing spout, and internal heating element.
Figure 23:
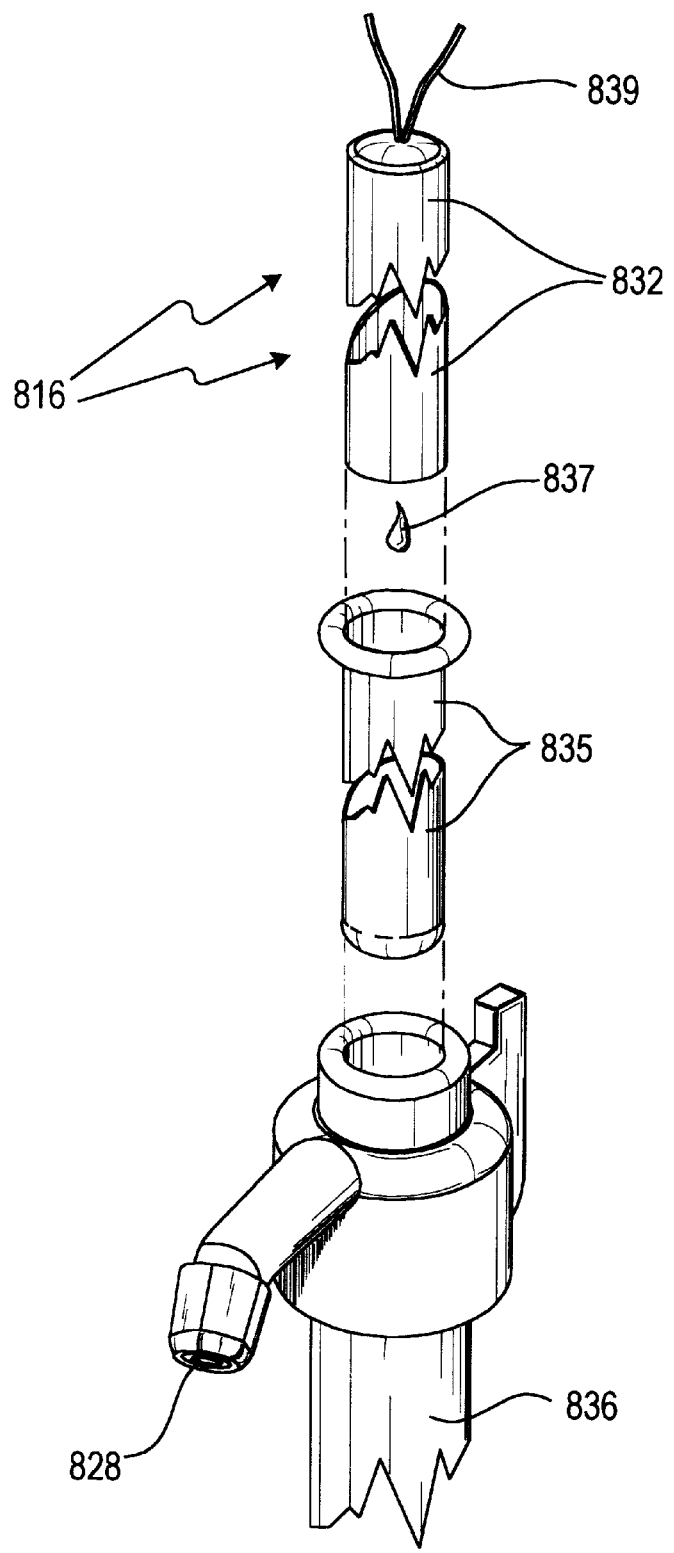
FIG. 23 is a front exploded view of the heating assembly prior to insertion in the preheating chamber.

In an alternative embodiment of the present invention shown in FIGS. 22–23, the heating assembly 816 is positioned within the internal diameter of the predelivery chamber 836. The heating element 832 is positioned within a heating tube or ferrule 835. FIG. 23 is an exploded view of the various components of this embodiment, including the heating element 832 which is slidingly engaged within the heating tube 835 by means of a lubricating grease 837, or other similar lubricant known in the art. The heating element 832 is electrically coupled with conductive wiring 839 to an electric source to provide energy for heating. This energy is preferably provided by electrical current or alternatively by batteries.

The heating tube 835 is preferably constructed of a metallic material such as stainless steel which provides excellent heat transfer properties. By placing the heating assembly 816 within the internal diameter of the predelivery chamber, the viscous lotion travels through an annular space defined by the internal diameter of the predelivery chamber 836 and the external diameter of the heating tube 835. This positioning optimizes the heat transfer from the heating assembly 816 to the viscous lotion and allows heating from substantially the bottom of the predelivery chamber to the top of the predelivery chamber as the lotion travels toward the delivery spout 828.

In a further embodiment of the present invention, the heated temperature of the lotion is determined by the amount of time the heating element is activated, as opposed to a thermostat which continually measures the heat of the lotion until a predetermined temperature is allowed. Thus, when the external pump button 124 is pushed to activate the lotion pump, a signal is sent which activates and provides an electrical current to the heating element 832 positioned within the metallic tube 835. Depending on the setting of the external temperature control switch, i.e. high, medium or low, a timer is set which activates the heating element 832 for a predetermined time period. In one embodiment of the present invention a time period of 11 seconds, 8 seconds, or 5 seconds, respectively is used to provide a dispensing lotion temperature of approximately 160° F., 140° and 120° F., respectively, and which corresponds to the "high", "medium" and "low" temperature settings.

In a preferred embodiment of the present invention the lotion dispenser and/or heater operates as follows:

1) a lotion, is first poured into the main lotion reservoir which is a non-heated storage container positioned in a location away from the main heating element.

2) The external pump button 124 on top of the unit is pushed, which activates the pump mechanism which drives lotion from the main lotion reservoir to the dispensing spout, thus priming the unit and supplying lotion to the predelivery chamber 836 for heating; purposes;

3) The temperature switch on the side of the dispensing unit should now be set by the user to a low, medium or high switch depending on the temperature preference of the user;

4) The dispensing unit is now plugged into an electrical outlet, which provides the electrical energy necessary for heating purposes;

5) The preheat button on the bottom side of the unit is then pressed by the user, which lights an LED light and activates the heater, which remains on for approximately 22 seconds to activate the heating element 832 which heats the lotion located in the predelivery chamber;

6) During the preheating stage, no lotion can be dispensed from the dispensing spout. The lotion can only be dispensed after the lotion is heated to a predetermined temperature;

7) Once the light goes out on the LED indicator switch, the user once again presses the pump/heat button on the top of the unit which dispenses lotion for as long a period as the button is depressed. Additionally, as the pump/heat button is activated, the heating element 832 is activated for a predetermined time period depending on the temperature setting. For example, if the high temperature setting is set, the heating element will be activated for approximately 11 seconds, which provides a dispensed lotion temperature of approximately 156°. Likewise, if the heating element button is depressed with the temperature setting button on medium, the heating element is activated for a period of 8 seconds, as opposed to 11 seconds for the high temperature setting.

Thus, by activating the heating element for a predetermined period of time the actual dispensed lotion temperature is known, which prevents the necessity of utilizing a thermostat to constantly measure the temperature of the lotion in the predelivery chamber and hence cycling and/or turning on and off the heating element for extended periods of time. It should be noted that the preheat button can be pressed but will not activate the heater for at least 15 minutes after first being pressed. Further, if the pump/heat button is pressed before the preheat button, the preheat button will additionally be activated for 15 minutes.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A fluid pump and delivery apparatus adapted for dispensing a viscous lotion at either ambient or elevated temperatures, comprising:
   a main fluid reservoir which is substantially unheated;
   a pumping assembly;
   a predelivery chamber;
   a heating assembly having a heating element positioned within an internal diameter of said predelivery chamber and which controls an exit temperature of the viscous lotion by heating the heating element for a predetermined period of time;
   a dispensing spout which dispenses the viscous lotion; and
   a power button in operative communication with said heating and said pumping assemblies which activates said heating and said pumping assemblies upon demand, wherein the viscous lotion stored in said main fluid reservoir is transferred to said dispensing spout after receiving heat energy from said heating element positioned within said predelivery chamber.

2. The apparatus of claim 1, further comprising a timer which powers-down the heating assembly after a predetermined time.

3. The apparatus of claim 1, further comprising a microprocessor which controls the temperature of the viscous lotion in the predelivery chamber based on the amount of time said heating assembly is activated.

4. The apparatus of claim 1, further comprising an insulating wall between the heating assembly and the main fluid reservoir.

5. The apparatus of claim 1, further comprising a temperature overheat sensor which powers-down the heating assembly if a temperature in said predelivery chamber reaches a predetermined temperature.

6. The apparatus of claim 1, wherein said viscous lotion substantially surrounds said heating assembly positioned within said predelivery chamber prior to being dispensed through said dispensing spout.

7. The apparatus of claim 1, further comprising a fluid conduit which includes the predelivery chamber and a dispensing spout, wherein a first internal diameter of at least a portion of the dispensing spout is less than a second internal diameter of at least a portion of the predelivery chamber.

8. The apparatus of claim 1, wherein said dispensing spout further comprises a check valve to prevent air from entering into said dispensing spout.

9. The apparatus of claim 1, wherein the pumping assembly includes:
   a gear pump spur;
   a motor; and
   a drive train including a plurality of gears, wherein the motor is interconnected to the drive train which is interconnected to the gear pump spur.

10. The apparatus of claim 1, wherein the main fluid reservoir is adapted to receive a disposable container.

11. The apparatus of claim 1, further comprising a fluid conduit which extends from the main fluid reservoir to the dispensing spout, said fluid conduit having an annular flow path which travels between an outer diameter of said heating assembly and an inner diameter of said predelivery chamber.

12. The apparatus of claim 1, further comprising a non-conductive housing comprised of a plastic material.

13. The fluid pump and delivery system for heating and dispensing the viscous fluid of claim 1, further comprising an LED for indicating if at least one of:
   the pump and delivery system is powered, and
   the viscous lotion is heated to a predetermined set point.

14. The apparatus of claim 1, further comprising a preheat button which heats said viscous lotion in said predelivery chamber prior to allowing said viscous lotion from being transferred from said predelivery chamber to said delivery spout.

15. A method for heating and dispensing a viscous fluid which includes substantial non-volatile constituent parts, comprising the steps of:
   storing the viscous fluid in a main fluid reservoir at an ambient temperature;
   pumping a portion of the viscous fluid into a predelivery chamber;
   heating the portion of the viscous fluid located in the predelivery chamber above the ambient temperature for a predetermined time period with a heating assembly positioned within the predelivery chamber; and
   dispensing the portion of the heated viscous fluid stored in the predelivery chamber through a dispensing spout upon depression of a power button which is in operative communication with a pumping assembly.

16. The method for heating and dispensing a viscous fluid of claim 15, further comprising the step of sealing an end of said dispensing spout near a delivery point with a check valve, wherein air is not allowed to enter the dispensing spout or predelivery chamber.

17. The method for heating and dispensing a viscous fluid of claim 15, wherein the dispensing step is powered by removable batteries.

18. The method of claim 15, wherein the fluid traveling through the predelivery chamber travels in an annular space defined by the interior diameter of the predelivery chamber and the exterior diameter of said heating element.

19. The method for heating and dispensing a viscous fluid of claim 15, wherein the heating step is performed electrically.

20. A pump and delivery system for dispensing and/or heating a viscous lotion, comprising:

a main fluid reservoir which is substantially unheated;

a pumping assembly;

a predelivery chamber;

a heating assembly having a heating element positioned within an internal diameter of said predelivery chamber;

a timer which controls the time said heating assembly is activated in the predelivery chamber to control an exit temperature of the dispensed viscous lotion;

an overheat sensor which powers-down the heating assembly if a temperature reaches a predetermined temperature;

a dispensing spout which dispenses the viscous lotion; and a power button coupled to said heating and said pumping assembly which activates the heating and pumping assembly upon demand, wherein the viscous fluid stored in the main fluid reservoir is transferred to the dispensing spout after receiving heat energy within said predelivery chamber.

21. The pump and delivery system of claim 20, wherein said dispensing spout further comprises a check valve positioned therein to substantially prevent air from entering said dispensing spout and traveling to said predelivery chamber.

22. The pump and delivery system of claim 20, further comprising a microprocessor in operative communication with said power button, said timer, said pumping assembly and said heating assembly, wherein when said power button is pushed the sequence and timing for pumping, heating and discontinuing heating is automatically controlled.

* * * * *